C. MACMILLAN.
THRUST MEASURING INSTRUMENT.
APPLICATION FILED FEB. 14, 1919.
1,347,348.
Patented July 20, 1920.
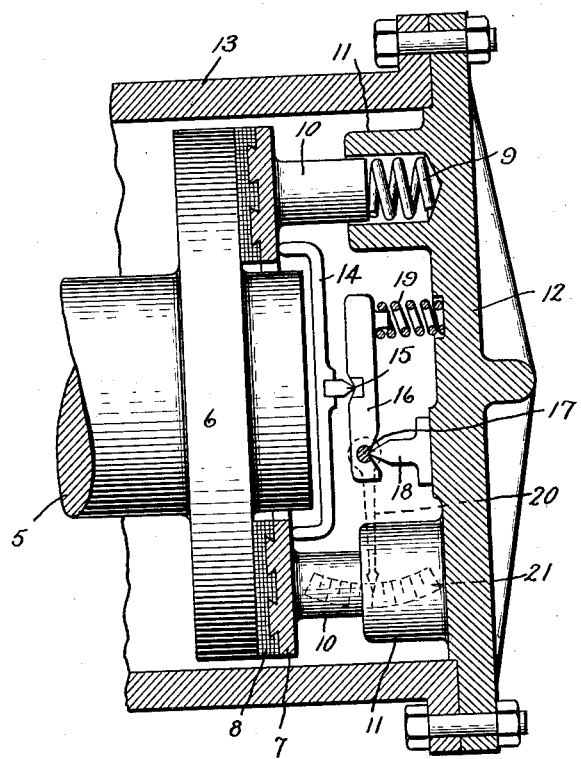
Inventor:
Campbell Macmillan,
by Albert G. Davis
His Attorney.

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

THRUST-MEASURING INSTRUMENT.

1,347,348.　　　　Specification of Letters Patent.　　Patented July 20, 1920.

Application filed February 14, 1919.　Serial No. 277,073.

*To all whom it may concern:*

Be it known that I, CAMPBELL MACMILLAN, a citizen of the United States, residing at Schenectady, in the county of Schenectady, State of New York, have invented certain new and useful Improvements in Thrust-Measuring Instruments, of which the following is a specification.

The present invention relates to instruments for measuring the axial thrust on a rotating shaft and has for its object to provide an improved structure and arrangement for this purpose.

For a consideration of what I believe to be novel and my invention, attention is directed to the accompanying description and the claims appended thereto.

In the drawing, the figure is a sectional view of a structure embodying my invention.

Referring to the drawing, 5 indicates a rotating shaft and 6 a thrust collar thereon which may be formed integral with the shaft or be a separate piece suitably fastened thereon. One application of the invention is to measure the thrust on the propeller shaft of a ship and shaft 5 may be accordingly a propeller shaft or other shaft. Engaging thrust collar 6 is an annular thrust plate 7 having a suitable lining 8 of bearing material and such plate is held yieldingly in engagement with collar 6 by springs 9. In the present instance the thrust plate is shown as provided with a ring of spaced projections 10 which move in guide sockets 11 in which springs 9 are located. The springs 9 are under no initial compression and as is obvious when an axial thrust is put on shaft 5 the springs will be compressed and there will be an axial movement of the thrust plate 7 which is proportionate to the thrust. Guide sockets 11 are carried by a head 12 which is fastened to a fixed casing 13.

To indicate the axial movement of shaft 5 and thrust plate 7 I provide a spider 14 having a knife edge center piece preferably made from hard steel which engages a bearing piece 15 set into a lever 16. One end of lever 16 is pivoted on a spindle 17 which engages a knife edge bearing member 18 carried by head 12 and the other end of lever 16 is pressed toward the spider 14 by a spring 19. Spindle 17 projects out through an opening in casing 13 and has on its end an index finger 20 which moves over a scale 21. When the thrust plate 7 moves axially lever 16 is turned on bearing member 18 compressing spring 19 and turning spindle 17 thereby moving index finger 20 over the scale 21.

The above described arrangement will give an accurate measure of the thrust on a shaft and has the advantages that it can be very quickly and easily substituted for the thrust bearing usually supplied for the shaft, and when in use it serves not only as a measuring instrument but also as a thrust bearing. Since the parts are all carried by head 12 to remove the instrument requires only that such head be removed.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. The combination with a continuously rotating shaft which is subjected to axial thrust, of a thrust collar on the shaft, an annular thrust plate which engages said collar, a casing, a head fixed to an end of said casing, spring means located between said head and thrust plate and directly engaging the thrust plate to hold it against said thrust collar and take the thrust of the shaft, and means for indicating axial movements of the shaft and thrust plate.

2. In a mechanism of the character described, the combination, with a continuously rotating shaft which is subjected to axial thrust, of a thrust collar thereon, an annular thrust plate which engages said collar, a casing, a head fixed to the casing, spring means carried by the head and engaging said thrust plate, a spindle, an indicating pointer on the spindle, and means actuated by an axial movement of the shaft for turning said spindle.

In witness whereof, I have hereunto set my hand this 13th day of February, 1919.

CAMPBELL MACMILLAN.